United States Patent
Shih

(10) Patent No.: US 7,606,364 B1
(45) Date of Patent: Oct. 20, 2009

(54) DISK DRIVE WITH FLEXIBLE DATA STREAM ENCRYPTION

(75) Inventor: Yin Shih, Saratoga, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 765 days.

(21) Appl. No.: 10/131,646

(22) Filed: Apr. 23, 2002

(51) Int. Cl.
*H04L 9/18* (2006.01)

(52) U.S. Cl. ........................................................ 380/42
(58) Field of Classification Search ........................ None
See application file for complete search history.

(56) References Cited

U.S. PATENT DOCUMENTS

| | | | |
|---|---|---|---|
| 3,355,668 A | 11/1967 | Boensel et al. | 328/167 |
| 3,436,670 A | 4/1969 | Solomon | 330/28 |
| 4,172,267 A | 10/1979 | Sidman | 360/78 |
| 4,972,350 A | 11/1990 | Sander et al. | 369/44.28 |
| 5,155,422 A | 10/1992 | Sidman et al. | 318/560 |
| 5,235,641 A | 8/1993 | Nozawa et al. | 380/21 |
| 5,291,110 A | 3/1994 | Andrews, Jr. et al. | 318/560 |
| 5,369,345 A | 11/1994 | Phan et al. | 318/561 |
| 5,375,243 A | 12/1994 | Parzych et al. | 726/17 |
| 5,475,545 A | 12/1995 | Hampshire et al. | 360/78.06 |
| 5,483,649 A | 1/1996 | Kuznetsov et al. | 726/22 |
| 5,748,744 A | 5/1998 | Levy et al. | 380/52 |
| 5,774,551 A | 6/1998 | Wu et al. | 380/25 |
| 5,784,461 A | 7/1998 | Shaffer et al. | 380/21 |
| 5,822,360 A | 10/1998 | Lee et al. | 375/200 |
| 5,838,793 A | 11/1998 | Lewis | 340/5.65 |
| 5,983,349 A | 11/1999 | Kodama et al. | 726/17 |
| 6,012,145 A | 1/2000 | Mathers et al. | 726/17 |
| 6,012,146 A | 1/2000 | Liebenow | 726/17 |
| 6,021,391 A | 2/2000 | Shyu | 705/1 |
| 6,061,449 A | 5/2000 | Candelore et al. | 380/28 |
| 6,064,676 A | 5/2000 | Slattery et al. | 370/412 |
| 6,073,122 A | 6/2000 | Wool | 705/51 |
| 6,076,137 A | 6/2000 | Asnaashari | 711/103 |
| 6,088,766 A | 7/2000 | Bachmat et al. | 711/114 |
| 6,101,588 A | 8/2000 | Farley | 711/168 |
| 6,122,716 A | 9/2000 | Combs | 711/163 |

(Continued)

OTHER PUBLICATIONS

Secure Digital Music Initiative; "SDMI Portable Device Specification"; Jul. 8, 1999; Los Angeles; http://www.sdmi.org.

(Continued)

*Primary Examiner*—Gilberto Barron
*Assistant Examiner*—Brandon S Bludau
(74) *Attorney, Agent, or Firm*—Robert P. Lenart, Esq.; Pietragallo Gordon Alfano Bosick & Raspanti, LLP

(57) ABSTRACT

A cipher engine performs cipher processing (encrypting/decrypting) on logical data streams in a physical data stream in a storage device. As the physical data stream changes from a first logical data stream to a second logical data stream, and the cipher engine switches from cipher processing the first logical data stream to the second logical data stream, cipher information of the first logical data stream is stored in a cipher state memory, cipher information of the second logical data stream is retrieved from the cipher state memory, and the cipher engine resumes cipher processing the second logical data stream using the cipher information of the second logical data stream. Advantageously, a virtually unlimited number of logical data streams is supported and duplicate cipher hardware is avoided.

71 Claims, 5 Drawing Sheets

U.S. PATENT DOCUMENTS

| | | | |
|---|---|---|---|
| 6,145,053 A | 11/2000 | Smith | 711/112 |
| 6,195,732 B1 | 2/2001 | Adams et al. | 711/156 |
| 6,204,988 B1 | 3/2001 | Codilian et al. | 360/75 |
| 6,421,450 B2 | 7/2002 | Nakano | 382/100 |
| 6,487,301 B1 | 11/2002 | Zhao | 382/100 |
| 6,487,646 B1 | 11/2002 | Adams et al. | 711/163 |
| 6,611,607 B1 | 8/2003 | Davis et al. | 382/100 |
| 6,636,966 B1 | 10/2003 | Lee et al. | 713/165 |
| 6,647,388 B2 | 11/2003 | Numao et al. | 707/9 |
| 6,772,340 B1 | 8/2004 | Peinado et al. | 713/168 |
| 6,823,398 B1 | 11/2004 | Lee et al. | 710/5 |
| 6,827,257 B2 | 12/2004 | Kobayashi et al. | 235/375 |
| 6,873,975 B1 | 3/2005 | Hatakeyama et al. | 705/51 |
| 6,983,371 B1 | 1/2006 | Hurtado et al. | 713/189 |
| 7,054,790 B1 | 5/2006 | Rich | 702/186 |
| 2001/0022848 A1 | 9/2001 | Rhoads | 382/100 |
| 2001/0056384 A1 | 12/2001 | Matsumura | 705/27 |
| 2002/0037091 A1 | 3/2002 | Terasaki | 382/100 |
| 2002/0099950 A1 | 7/2002 | Smith | 713/200 |
| 2002/0144130 A1 | 10/2002 | Rosner et al. | 713/188 |
| 2002/0156797 A1 | 10/2002 | Lee et al. | 707/200 |
| 2002/0191793 A1* | 12/2002 | Anand et al. | 380/255 |
| 2003/0018917 A1 | 1/2003 | Brown, Sr. | 713/201 |
| 2003/0055671 A1 | 3/2003 | Nassar | 705/1 |

OTHER PUBLICATIONS

Digimarc Corporation; "Digital Watermarking Solutions"; 1995-2006; http://www.digimarc.com/watermark.

* cited by examiner

DISK DRIVE WITH FLEXIBLE DATA STREAM ENCRYPTION

FIELD OF THE INVENTION

The present invention relates generally to data storage devices, and more particularly to storing encrypted logical data streams in disk drives.

BACKGROUND OF THE INVENTION

A disk drive typically includes a head-disk assembly (HDA) with a transducer and a disk, a buffer for temporarily storing data and a controller for controlling data transfer operations between the disk and an external system such as a host computer. The data is stored in substantially concentric tracks on the disk. During disk drive operation, the disk is rotated about an axis by a spindle motor while the transducer reads from and writes to a target track on the disk. A servo control loop uses servo data read from the disk to position the transducer above the target track while the data transfer occurs.

A single physical data stream is typically transferred between the HDA and the controller during read and write operations. The physical data stream includes a logical data stream (such as a file) sequentially followed by another logical data stream, sequentially followed by another logical data stream and so on. Thus, the physical data stream is a serial bit stream and the logical data streams are in sequence. However, for audio/video (A/V) streaming, it is desirable to divide the physical data stream into multiple interleaved logical data streams of related content which are accessed continuously and appear to be accessed in parallel.

The host computer is the consumer process and the disk is the source process during a read operation as data is transferred from the disk to the host computer, and the disk is the consumer process and the host computer is the source process during a write operation as data is transferred from the host computer to the disk. Typically, the buffer is loaded with data and is refilled with more data when the data is withdrawn by the consumer process so that data is continuously available for the consumer process. Buffer starvation occurs when the buffer does not contain data needed by the consumer process. For example, if the disk drive takes too long to transfer data from the disk to the buffer, then the host computer may empty the buffer of data yet still require more data. In A/V applications, in which the host computer requires real-time display of the A/V data, if the A/V data is not available from the disk drive in time then the host computer displays a still image instead of a moving image (an undesirable result).

The disk drive can include a cipher engine for encrypting data before storage to the disk and decrypting data after retrieval from the disk. The cipher engine encrypts and decrypts only one logical data stream at a time because cipher algorithms are generally applied on a per-stream basis. Therefore, simultaneous streaming applications such as A/V streaming require the disk drive to contain multiple cipher engines to provide separate cipher processing for the interleaved logical data streams. However, multiple cipher engines require expensive duplicate hardware, can simultaneously process only as many logical data streams as corresponding cipher engines, and are wasteful when simultaneous streaming is unnecessary.

There is, therefore, a need for a high speed, flexible cipher system for a disk drive that provides cost-effective encryption/decryption for a substantially unlimited number of logical data streams.

SUMMARY OF THE INVENTION

The present invention satisfies these needs. A storage device includes a cipher engine, a cipher state memory and a storage media. The cipher engine performs cipher processing (encrypting/decrypting) on logical data streams in a physical data stream. As the physical data stream changes from a first logical data stream to a second logical data stream, and the cipher engine switches from cipher processing the first logical data stream to the second logical data stream, cipher information of the first logical data stream is stored in the cipher state memory, cipher information of the second logical data stream is retrieved from the cipher state memory, and the cipher engine resumes cipher processing the second logical data stream using the cipher information of the second logical data stream.

The cipher information of the logical data stream enables the cipher engine to resume cipher processing the logical data stream where it left off. The cipher information can include a cipher key for the logical data stream and state information of the cipher engine corresponding to cipher processing the logical data stream when the cipher processing was previously interrupted.

The cipher processing can include determining whether cipher information of the second logical data stream is stored in the cipher state memory, and if not, then cipher processing the second logical data stream and storing cipher information of the second logical data stream in the cipher state memory when the cipher processing is interrupted.

The cipher processing can include switching from cipher processing the second logical data stream to the first logical data stream by storing cipher information of the second logical data stream in the cipher state memory, retrieving cipher information of the first logical data stream from the cipher state memory, and resuming cipher processing the first logical data stream using the cipher information of the first logical data stream.

The cipher processing can include receiving the physical data stream at an interface, encrypting the logical data streams using the cipher engine and storing the encrypted logical data streams on the storage media.

The cipher processing can include retrieving the encrypted physical data stream from the storage media, decrypting the encrypted logical data streams using the cipher engine and sending the logical data streams to the interface.

The cipher engine can switch from cipher processing one logical data stream to another logical data stream during and in response to a latency period in which the storage device cannot read the logical data streams from or write the logical data streams to the storage media, for instance as the storage device gains access to a data block on the storage media. If the storage device is a disk drive and the storage media is a disk, then the cipher process switching can occur during and in response to an electromechanical delay of the disk drive in which the transducer cannot read user data from or write user data to the disk, for instance as the transducer reads a servo preamble from the disk, the transducer moves during a seek operation, or the disk rotates until the transducer gains access to a selected sector on the disk.

Advantageously, the present invention provides a high speed, flexible cipher system for a storage device that provides encryption/decryption for a substantially unlimited number of interleaved logical data streams and rapid real-time cipher process switching between logical data streams with little or no throughput delay. Moreover, duplicate cipher hardware is avoided.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

Figure 1:
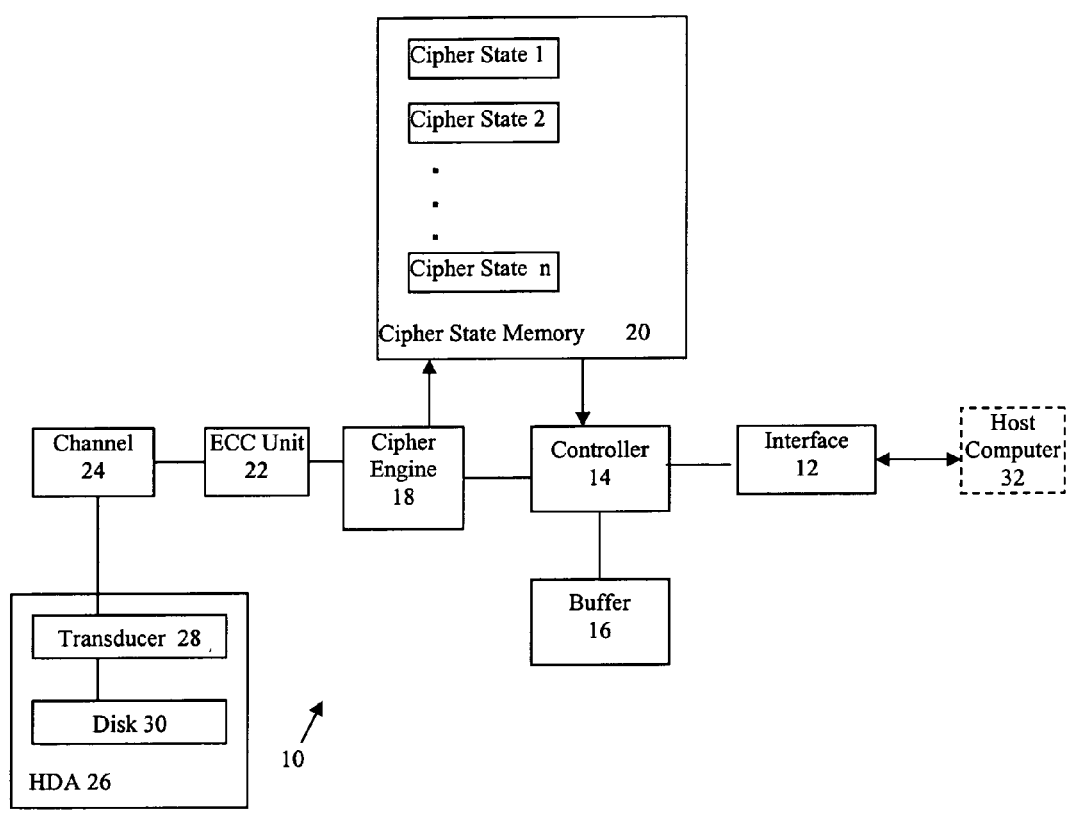
FIG. 1 shows a disk drive with a cipher engine and a cipher state memory.

FIG. 1 shows a disk drive 10 that includes an interface 12, a controller 14, a buffer 16, a cipher engine 18, a cipher state memory 20, an error correction code (ECC) unit 22, a read/write channel 24 and an HDA 26. The HDA 26 includes a transducer 28 and a disk 30.

The interface 12 communicates with a host computer 32. The controller 14 manages the read and write operations, tracks which data blocks are associated with which logical data streams and uses the tracking information to transfer cipher information between the cipher engine 18 and the cipher state memory 20. The transducer 28 reads from and writes to the disk 30.

During a write operation, a physical data stream is sent from the host computer 32 to the interface 12, transferred to the buffer 16, processed by the cipher engine 18, the ECC unit 22 and the channel 24 and written by the transducer 28 to the disk 30. During a read operation, a physical data stream is read from the disk 30 by the transducer 28, processed by the channel 24, the ECC unit 22 and the cipher engine 18, transferred to the buffer 16 and sent from the interface 12 to the host computer 32.

The physical data stream includes multiple logical data streams composed of data blocks, and for illustration purposes, the physical data stream is an A/V stream in which the logical data streams are interleaved.

The cipher engine 18 implements a cipher algorithm to cipher process the logical data streams. The cipher algorithm incorporates an initial cipher key, an algorithm for modifying the cipher key as it is used, and an algorithm for applying the cipher key to the data to be encrypted or decrypted (cipher/decipher). The logical data streams are continuous bit streams organized into blocks of bits or bytes in conformance with the cipher algorithm.

During a write operation, the cipher engine 18 encrypts the logical data streams to generate encrypted logical data streams that are stored on the disk 30. During a read operation, the cipher engine 18 decrypts the encrypted logical data streams that are retrieved from the disk 30 to generate the logical data streams.

The cipher state memory 20 maintains cipher states (1, 2 . . . n) corresponding to the logical data streams (1, 2, . . . n). For instance, cipher state 1 corresponds to logical data stream 1, cipher state 2 corresponds to logical data stream 2, and so on.

The cipher state includes state information of the cipher engine 18 when the cipher engine 18 was previously cipher processing the logical data stream, thereby enabling the cipher engine 18 to resume cipher processing the logical data stream where it left off. That is, the cipher state is a "snap shot" of cipher information that the cipher engine 18 previously used to cipher process the logical data stream and that the cipher engine 18 needs to continue cipher processing the logical data stream at the location in the logical data stream where the cipher processing was interrupted. The cipher state may include a cipher key for encrypting/decrypting the logical data stream, data block boundaries in the logical data stream in relation to sector boundaries on the disk 30 (such as alignment of the data blocks to the sectors), a snapshot of different stages of the cipher algorithm, and transformation of the data blocks (such as rotation of the data blocks and swapping bit locations in the data blocks).

The cipher state is implementation dependent. For instance, if the cipher algorithm specifies a rotation operation mathematically, the implementation can be a shift register or a swap of two bytes which require different state information to resume the cipher processing.

The disk drive 10 provides flexible cipher processing for a virtually unlimited number of logical data streams by swapping the cipher states between the cipher engine 18 and the cipher state memory 20 as the logical data streams change. The controller 14 prompts the cipher engine 18 to switch between different cipher states for different logical data streams. The switching between the cipher states enables multiplexing (multitasking) independent cipher processing for interleaved logical data streams. Moreover, the number of logical data streams that the cipher process switching can accommodate is limited only by the storage capacity of the cipher state memory 20.

The controller 14 monitors the physical data stream on a data block by data block basis and detects the boundaries between the logical data streams that prompt a switch between the cipher processes. When cipher processing a current logical data stream, upon encountering a boundary with another logical data stream, the controller 14 multiplexes the cipher processes by saving the cipher state of the cipher engine 18 for the current logical data stream in the cipher state memory 20, retrieving the cipher state of the cipher engine 18 for the other logical data stream from the cipher state memory 20, and prompting the cipher engine 18 to resume cipher processing the other logical data stream using the other cipher state.

The data blocks of the physical data stream (and the logical data streams) and the cipher blocks of the cipher engine 18 may not align with one another at their respective boundaries. For instance, data blocks of 64 bits may align with the cipher blocks, whereas data blocks of 512 bytes, TCP/IP data blocks of 0.5, 1 and 2 kilobytes and MPEG broadcasts may not. As a result, the cipher processing may switch between logical data streams at a boundary between the data blocks that occurs in the middle of a cipher block. Nevertheless, saving the cipher state of the cipher engine 18 for the interrupted logical data stream in the cipher state memory 20 enables the cipher engine 18 to resume cipher processing the interrupted logical data stream even though the cipher processing was interrupted in the middle of a cipher block.

The controller 14 detects latency periods in which the transducer 28 cannot read user data from or write user data to the disk 30. The latency periods occur due to inherent electromechanical delay in the disk drive 10, such as the transducer 28 reading a servo preamble from the disk 30, the transducer 28 moving radially across the disk 30 during a seek operation, and the disk 30 rotating until the transducer 28 accesses a selected sector on the disk 30. The latency periods have a duration of several microseconds to a few milliseconds. With data blocks and sectors of 512 bytes, an opportunity exists every 512 bytes to perform the cipher process switching between the data blocks during a latency period. Even extremely complex cipher states, such as those associated with the cipher blocks, can be saved in the cipher state memory 20 during a latency period without time penalty. Furthermore, the cipher process switching can occur more rapidly, if necessary, by deferring it until a cipher block boundary occurs at which time the cipher state is typically simplest. Therefore, the controller 14 prompts the cipher engine 18 to switch between different cipher states for different logical data streams during and in response to a latency period, thereby providing a time window to perform the cipher process switching without slowing down the data transfer. As a result, the cipher process switching is essentially transparent to source/consumer processes. Moreover, the cipher engine 18 and the cipher state memory 20 need only be fast enough to perform the cipher process switching during a latency period, thereby reducing cost. In those infrequent instances in which the cipher process switching cannot be performed during a latency period, the cipher process switching may force a data transfer delay such as a revolution of the disk 30.

If the disk drive 10 is an ATA device (with an ATA interface 12), the ATA command set can be modified to support additional streaming commands for reading and writing large amounts of A/V data to and from files on the disk 30. For instance, the disk drive 10 can read 256 data blocks from A/V file 1, write 512 data blocks to A/V file 2, and so on, and the cipher engine 18 can encrypt/decrypt the logical data streams associated with the files.

If the disk drive 10 is a 1394 device (with a 1394 interface 12), the interface 12 receives a physical data stream which is demultiplexed into multiple logical data streams. The disk drive 10 includes multiple physical data paths and functional blocks between the interface 12 and the controller 14 that provide additional A/V stream processing such as conditional access decoding and MPEG trick play manipulation for the demultiplexed logical data streams. The controller 14 then reduces (merges) the demultiplexed logical data streams into a physical data stream which is transferred to the cipher engine 18.

The controller 14 also maintains a file system for each logical data stream and prevents buffer starvation for the consumer process. The controller 14 determines the amount of data in the buffer 16 and the location on the disk 30 of the corresponding logical data stream (to be read from the disk 30 or to be written to the disk 30) to ensure that the consumer process does not encounter buffer starvation. For instance, if a first A/V consumer process in the host computer 32 is closer than a second A/V consumer process in the host computer 32 to emptying its data from the buffer 16, then the first A/V consumer process may receive priority over the second A/V consumer process to receive its data from the disk drive 10. On the other hand, if the second A/V consumer process is closer than the first A/V consumer process to a latency period, then a priority choice needs to be made. In this instance, the first A/V consumer process receives priority since it is approaching buffer starvation.

As an example, the host computer 32 commands the disk drive 10 to store a physical data stream with A/V content. The physical data stream includes first and second logical data streams, the first logical data stream includes first data blocks and third data blocks, the second logical data stream includes second data blocks, the first and third data blocks are adjacent to one another in the first logical data stream, and the first and third data blocks are separated from one another by the second data blocks in the physical data stream. Thus, the physical data stream is a serial bit stream that provides the first, second and third data blocks in sequence, and the first and second logical data streams are interleaved.

The disk drive 10 receives the physical data stream from the host computer 32 at the interface 12, and the controller 14 transfers the physical data stream from the interface 12 to the buffer 16.

The cipher engine 18 encrypts the first data blocks, thereby generating first encrypted data blocks that the transducer 28 writes to the disk 30. The controller 14 detects the boundary between the first and second data blocks, interrupts the cipher engine 18 between encrypting the first and second data blocks and transfers cipher state 1 from the cipher engine 18 to the cipher state memory 20. Cipher state 1 contains corresponding state information of the cipher engine 18 based on encrypting the first logical data stream at the interrupt between the first and second data blocks, and enables the cipher engine 18 to resume encrypting the first logical data stream at the third data blocks.

The cipher engine 18 encrypts the second data blocks, thereby generating second encrypted data blocks that the transducer 28 writes to the disk 30. The controller 14 detects the boundary between the second and third data blocks, interrupts the cipher engine 18 between encrypting the second and third data blocks, transfers cipher state 2 from the cipher engine 18 to the cipher state memory 20 and transfers cipher state 1 from the cipher state memory 20 to the cipher engine 18. Cipher state 2 contains corresponding state information of the cipher engine 18 based on encrypting the second logical data stream at the interrupt between the second and third data blocks, and enables the cipher engine 18 to resume encrypting the second logical data stream after the second data blocks.

The cipher engine 18 resumes encrypting the first logical data stream and encrypts the third data blocks using cipher state 1, thereby generating third encrypted data blocks that the transducer 28 writes to the disk 30. The controller 14 detects the boundary between the third data blocks the second logical data stream, interrupts the cipher engine 18 after encrypting the third data blocks, transfers cipher state 1 from the cipher engine 18 to the cipher state memory 20 and transfers cipher state 2 from the cipher state memory 20 to the cipher engine 18, and the cipher engine 18 resumes encrypting the second logical data stream after the second data blocks using cipher state 2. Cipher state 1 now contains corresponding state information of the cipher engine 18 based on encrypting the first logical data stream at the interrupt after the third data blocks (rather than between the first and second data blocks), and enables the cipher engine 18 to resume encrypting the first logical data stream after the third data blocks.

The cipher engine 18 continues switching between encrypting the first and second logical data streams using cipher states 1 and 2, respectively, until the physical data stream has been encrypted, thereby generating an encrypted physical data stream that the transducer 28 writes to the disk 30.

The host computer 32 subsequently commands the disk drive 10 to retrieve the A/V content. The transducer 28 reads the encrypted physical data stream from the disk 30, and the controller 14 transfers the encrypted physical data stream to the cipher engine 18.

The encrypted physical data stream includes first and second encrypted logical data streams, the first encrypted logical data stream includes first encrypted data blocks and third encrypted data blocks, the second encrypted logical data stream includes second encrypted data blocks, the first and third encrypted data blocks are adjacent to one another in the first encrypted logical data stream, and the first and third encrypted data blocks are separated from one another by the second encrypted data blocks in the encrypted physical data stream. Thus, the encrypted physical data stream is a serial bit stream that provides the first, second and third encrypted data blocks in sequence, and the first and second encrypted logical data streams are interleaved.

The cipher engine 18 decrypts the first encrypted data blocks, thereby generating the first data blocks. The controller 14 detects the boundary between the first and second encrypted data blocks, interrupts the cipher engine 18 between decrypting the first and second encrypted data blocks and transfers cipher state 1 from the cipher engine 18 to the cipher state memory 20. Cipher state 1 contains corresponding state information of the cipher engine 18 based on decrypting the first encrypted logical data stream at the interrupt between the first and second encrypted data blocks, and enables the cipher engine 18 to resume decrypting the first encrypted logical data stream at the third encrypted data blocks.

The cipher engine 18 decrypts the second encrypted data blocks, thereby generating the second data blocks. The controller 14 detects the boundary between the second and third encrypted data blocks, interrupts the cipher engine 18 between decrypting the second and third encrypted data blocks, transfers cipher state 2 from the cipher engine 18 to the cipher state memory 20 and transfers cipher state 1 from the cipher state memory 20 to the cipher engine 18. Cipher state 2 contains corresponding state information of the cipher engine 18 based on decrypting the second encrypted logical data stream at the interrupt between the second and third encrypted data blocks, and enables the cipher engine 18 to resume decrypting the second encrypted logical data stream after the second encrypted data blocks.

The cipher engine 18 resumes decrypting the first encrypted logical data stream and decrypts the third encrypted data blocks using cipher state 1, thereby generating the third data blocks. The controller 14 detects the boundary between the third encrypted data blocks and the second encrypted logical data stream, interrupts the cipher engine 18 after decrypting the third encrypted data blocks, transfers cipher state 1 from the cipher engine 18 to the cipher state memory 20 and transfers cipher state 2 from the cipher state memory 20 to the cipher engine 18, and the cipher engine 18 resumes decrypting the second encrypted logical data stream after the second encrypted data blocks using cipher state 2. Cipher state 1 now contains corresponding state information of the cipher engine 18 based on decrypting the first encrypted logical data stream at the interrupt after the third encrypted data blocks (rather than between the first and second encrypted data blocks), and enables the cipher engine 18 to resume decrypting the first encrypted logical data stream after the third encrypted data blocks.

The cipher engine 18 continues switching between decrypting the first and second encrypted logical data streams using cipher states 1 and 2, respectively, until the encrypted physical data stream has been decrypted, thereby generating the physical data stream.

The controller 14 transfers the physical data stream (decrypted from the encrypted physical data stream) from the buffer 16 to the interface 12, and the disk drive 10 sends the physical data stream from the interface 12 to the host computer 32.

Figure 2:
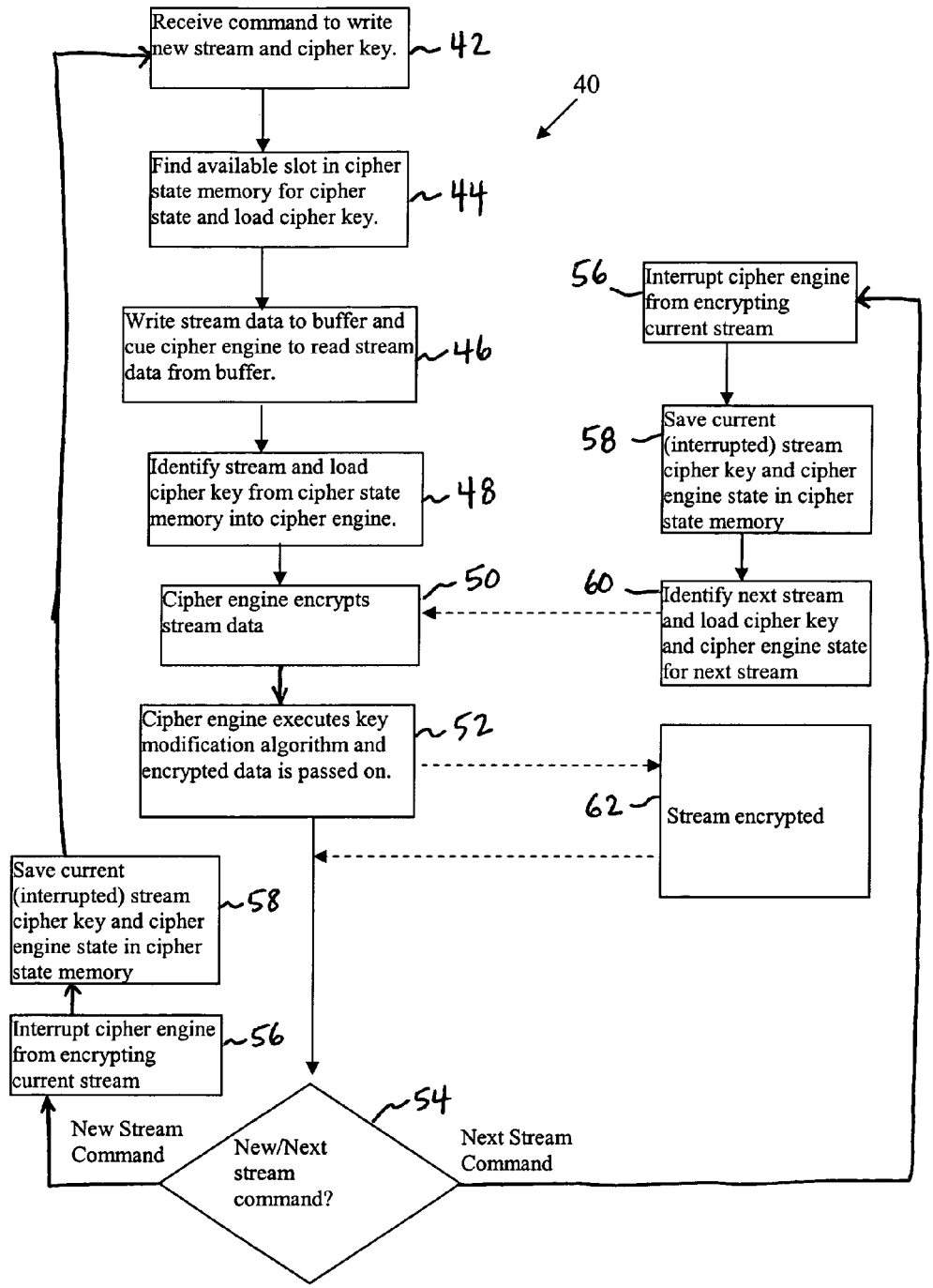
FIG. 2 shows a flowchart for encrypting logical data streams during a write operation in the disk drive.

FIG. 2 shows a flowchart 40 for encrypting logical data streams using the cipher engine 18 and the cipher state memory 20 during a write operation in the disk drive 10.

The controller 14 receives a command to write a new logical data stream along with an initial cipher key for encrypting the logical data stream (step 42). The controller 14 finds an unused slot (entry) in the cipher state memory 20 for a new cipher state, clears the cipher state values in the slot and loads the cipher state (the cipher key) for the logical data stream in the cipher state memory 20 (step 44). The controller 14 begins writing data in the logical data stream to the buffer 16 and cues the cipher engine 18 to begin reading data in the logical data stream from the buffer 16 as buffer blocks in the buffer 16 are filled (step 46). As the cipher engine 18 reads data in the logical data stream from the buffer 16, the controller 14 identifies the logical data stream and loads the cipher state (the cipher key) for the logical data stream from the cipher state memory 20 into the cipher engine 18 (step 48). The cipher engine 18 proceeds to encrypt data in the logical data stream from the buffer 16 by executing a cipher algorithm using the cipher key in the cipher state (step 50), executes a key modification algorithm for the cipher key and passes the encrypted data downstream to the ECC unit 22 and the channel 24 for further processing and then the transducer 28 for writing to the disk 30 (step 52).

A determination is made whether (1) a write command for a new logical data stream is received, (2) a write command for a next logical data stream (which is interleaved with the current logical data stream and has previously been processed by steps 42-52) is received, or (3) no write command is received (step 54).

If a write command for a new logical data stream is received (step 54), then the controller 14 interrupts the cipher engine 18 from encrypting data in the current logical data stream (step 56), saves the cipher state (the cipher key and state information of the cipher engine 18 at the interrupt) for the current logical data stream in the cipher state memory 20 (step 58) and steps 42-52 are repeated for the new logical data stream.

If a write command for a next logical data stream is received (step 54), then the controller 14 interrupts the cipher engine 18 from encrypting data in the current logical data stream (step 56), saves the cipher state (the cipher key and state information of the cipher engine 18 at the interrupt) for the current logical data stream in the cipher state memory 20 (step 58), identifies the next logical data stream in the buffer 16 and loads the cipher state (the cipher key and state information of the cipher engine 18 where encrypting the next logical data stream was previously interrupted) for the next logical data stream from the cipher state memory 20 into the cipher engine 18 (step 60). Thereafter, the cipher engine 18 encrypts data in the next logical data stream from the buffer 16 using the cipher state for the next logical data stream (step 50), executes a key modification algorithm for the cipher key and passes the encrypted data downstream for writing to the disk 30 (step 52).

If no write command is received (step 54), then the cipher engine 18 continues to encrypt data in the logical data stream (step 50) and pass the encrypted data downstream (step 52) until all data in the logical data stream is emptied from the buffer 16, encrypted and stored on the disk 30 (step 62).

Figure 3:
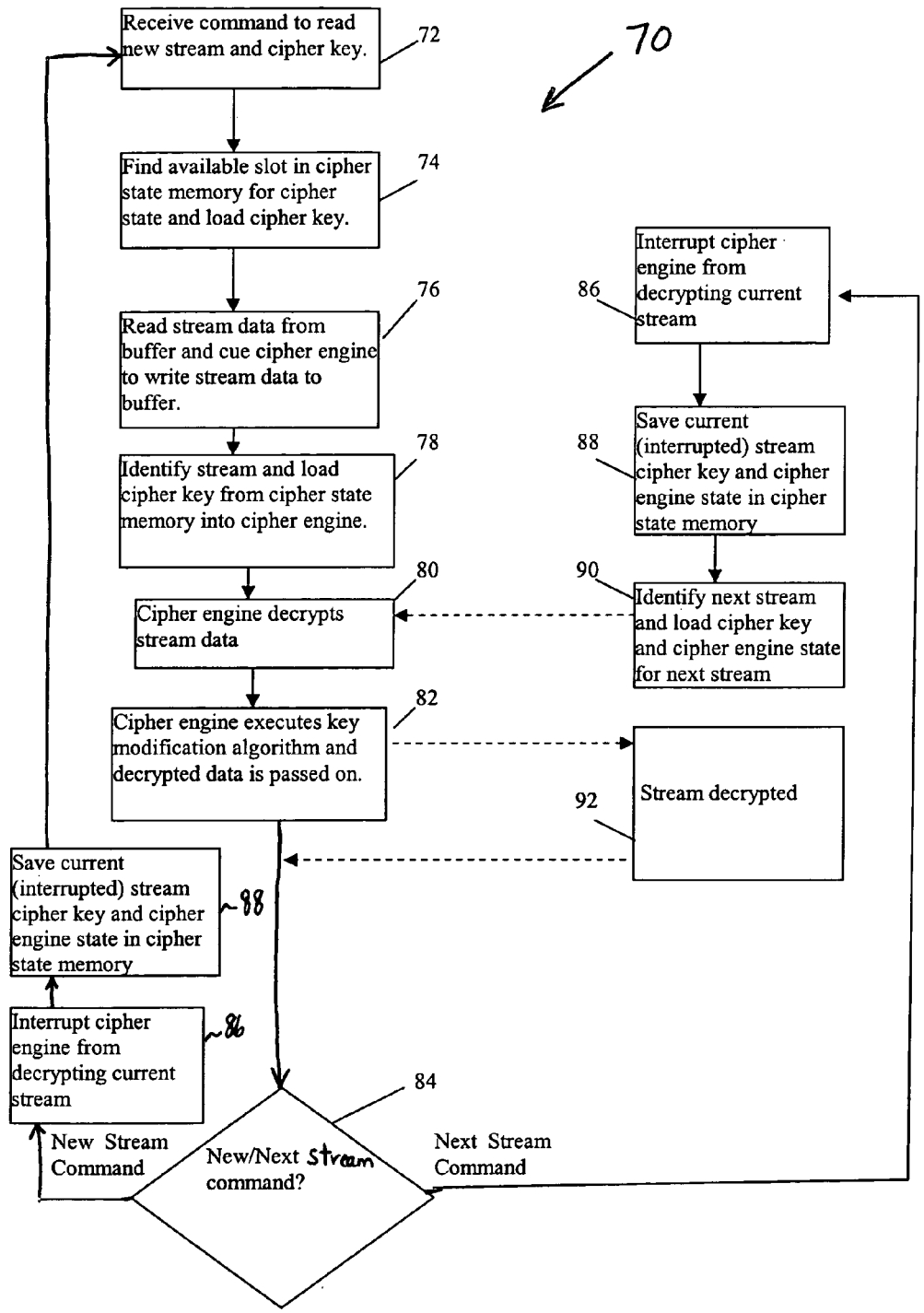
FIG. 3 shows a flowchart for decrypting logical data streams during a read operation in the disk drive.

FIG. 3 shows a flowchart 70 for decrypting logical data streams using the cipher engine 18 and the cipher state memory 20 during a read operation in the disk drive 10.

The controller 14 receives a command to read a new logical data stream along with an initial cipher key for decrypting the logical data stream (step 72). The controller 14 finds an unused slot (entry) in the cipher state memory 20 for a new cipher state, clears the cipher state values in the slot and loads the cipher state (the cipher key) for the logical data stream in the cipher state memory 20 (step 74). The controller 14 causes the transducer 28 to begin reading data in the logical data stream from the disk 30, passing the data upstream to the ECC unit 22 and the channel 24 for further processing and writing the data to the buffer 16 and cues the cipher engine 18 to begin reading data in the logical data stream from the buffer 16 as buffer blocks in the buffer 16 are filled (step 76). As the cipher engine 18 reads data in the logical data stream from the buffer 16, the controller 14 identifies the logical data stream and loads the cipher state (the cipher key) for the logical data stream from the cipher state memory 20 into the cipher engine 18 (step 78). The cipher engine 18 proceeds to decrypt data in the logical data stream from the buffer 16 by executing a cipher algorithm using the cipher key in the cipher state (step 80), executes a key modification algorithm for the cipher key and passes the decrypted data upstream to the interface 12 (step 82).

A determination is made whether (1) a read command for a new logical data stream is received, (2) a read command for a next logical data stream (which is interleaved with the current logical data stream and has previously been processed by steps 72-82) is received, or (3) no read command is received (step 84).

If a read command for a new logical data stream is received (step 84), then the controller 14 interrupts the cipher engine 18 from decrypting data in the current logical data stream (step 86), saves the cipher state (the cipher key and state information of the cipher engine 18 at the interrupt) for the current logical data stream in the cipher state memory 20 (step 58) and steps 72-82 are repeated for the new logical data stream.

If a read command for a next logical data stream is received (step 84), then the controller 14 interrupts the cipher engine 18 from decrypting data in the current logical data stream (step 86), saves the cipher state (the cipher key and state information of the cipher engine 18 at the interrupt) for the current logical data stream in the cipher state memory 20 (step 88), identifies the next logical data stream in the buffer 16 and loads the cipher state (the cipher key and state information of the cipher engine 18 where decrypting the next logical data stream was previously interrupted) for the next logical data stream from the cipher state memory 20 into the cipher engine 18 (step 90). Thereafter, the cipher engine 18 decrypts data in the next logical data stream from the buffer 16 using the cipher state for the next logical data stream (step 80), executes a key modification algorithm for the cipher key and passes the decrypted data upstream to the interface 12 (step 82).

If no read command is received (step 84), then the cipher engine 18 continues to decrypt data in the logical data stream (step 80) and pass the decrypted data upstream (step 92) until all data in the logical data stream is emptied from the buffer 16, decrypted and transferred to the interface 12 (step 92).

The cipher process switching can be prompted and controlled in a wide variety of ways and is not limited to the controller 14 monitoring the physical data stream on a data block by data block basis.

Figure 4:
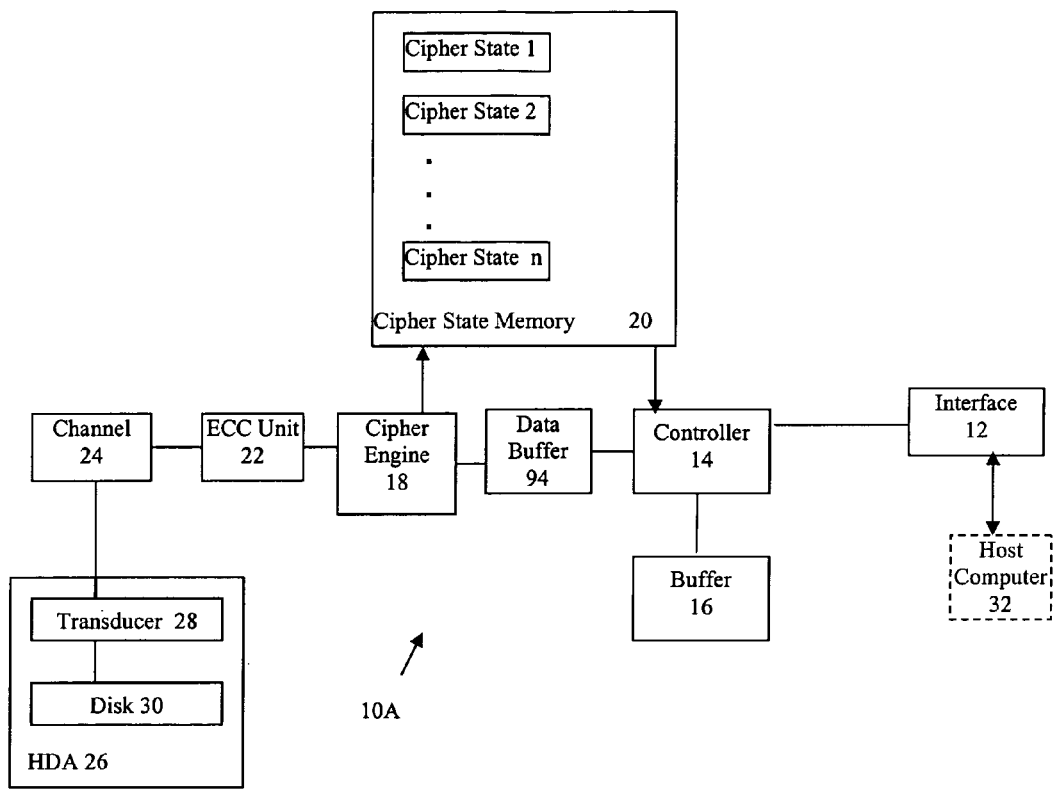
FIG. 4 shows the disk drive with another architecture.

FIG. 4 shows a disk drive 10A similar to the disk drive 10 that includes a data buffer 94 between the controller 14 and the cipher engine 18. The controller 14 is unaware of which logical data stream the cipher engine 18 is processing since the data buffer 94 decouples the timing between the controller 14 and the cipher engine 18. The controller 14 manages the cipher process switching based on polled status (such as buffer state, cipher bit/byte/block count or another metric) or interrupts associated with the progress or completion of the read/write operation.

Figure 5:
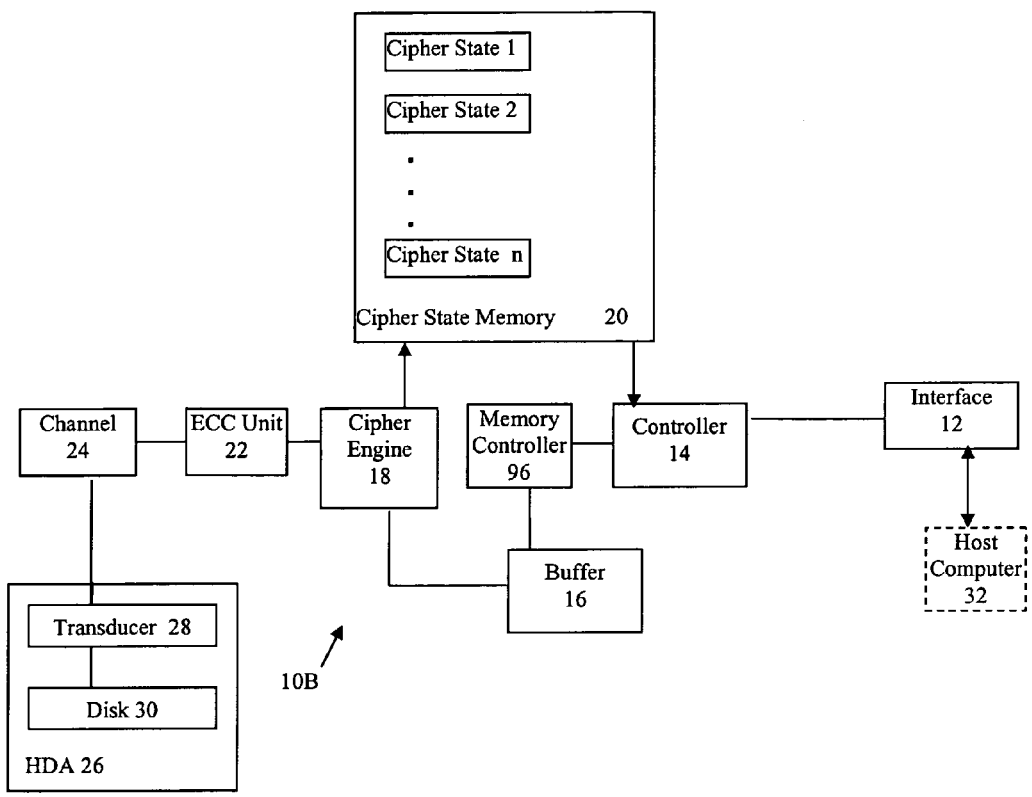
FIG. 5 shows the disk drive with another architecture.

FIG. 5 shows a disk drive 10B similar to the disk drive 10 that includes a memory controller 96 between the controller 14 and the buffer 16. The controller 14 is unaware of which logical data stream the cipher engine 18 is processing since the memory controller 96 decouples the timing between the controller 14 and the cipher engine 18. The memory controller 96 is a "proxy" for the controller 14 and performs the cipher process switching.

As another example, the controller 14 pre-pends a stream identification header to the logical data stream as it is written to the buffer 16. The header can be on a per sector basis or another pre-determined cluster appropriate to the stream structure or flagged by special header codes. When the cipher engine 18 reads the logical data stream from the buffer 16, the cipher engine 18 detects the header specifying which logical data stream is being written/read and retrieves the cipher state for the logical data stream from the cipher state memory 20. The cipher engine 18 then encrypts/decrypts the logical data stream until the cipher engine 18 detects another header specifying another logical data stream and therefore a cipher process switch.

As another example, a table that identifies the data block (or sector) addresses associated with the logical data streams is loaded into the cipher engine 18. Whenever a command is received to read/write data blocks, the cipher engine 18 checks the data block addresses against the table, determines the corresponding logical data stream and loads the cipher state for the logical data stream from the cipher state memory 20.

The present invention is applicable to storage devices such as disk drives, optical storage devices, DVD and CD-ROM. Likewise, the disk drive 10 can be implemented with other architectures than those described herein. For instance, the disk drive 10 can have multiple transducers 28 and corresponding disks 30.

This controller 14 or the host computer 32 can manage the cipher process switching, based on factors such as buffer starvation, latency periods, storage location and so on. For instance, if the disk drive 10 is a 1394 device then the controller 14 can manage the cipher process switching, whereas if the disk drive 10 is an ATA device and the physical data stream is MPEG-2 or MPEG-4 then the host computer 32 can manage the cipher process switching.

The cipher engine 18 can be a separate block between the controller 14 and the channel 24 (as shown) or incorporated in the controller 14. The cipher engine 18 can be a hardware block, such as hardware accelerated function blocks combined with firmware, or a software process within the controller 14. Likewise, the cipher engine 18 and the ECC unit 22 can be incorporated in the controller 14.

The cipher state memory 20 can be a dedicated memory for the cipher engine 18 (as shown) or a portion of another memory such as local memory in the controller 14, the buffer 16 or the disk 30 (when the time interval between stream switches is long and the stream bandwidth is not demanding on the disk drive 10).

Although the present invention has been described in considerable detail with regard to the preferred versions thereof, other versions are possible. Therefore, the appended claims should not be limited to the descriptions of the preferred versions contained herein.

What is claimed is:

1. In a storage device having a cipher state memory and a storage media, a method for cipher processing multiple logical data streams of a physical data stream, comprising:

maintaining cipher information for the logical data streams in the cipher state memory;

receiving a command to write a logical data stream to, or read a logical data stream from, the storage media;

if currently cipher processing a previous logical data stream, then switching to cipher processing a received logical data stream by (i) interrupting cipher processing the previous logical data stream, and (ii) storing the cipher information of the previous logical data stream in the cipher state memory, wherein the cipher information of the previous logical data stream includes state information based on the previous logical data stream at the interrupting that enables resumption of cipher processing the previous logical data stream; and if the received logical data stream is a previously interrupted logical data stream, then retrieving the cipher information of the received logical data stream from the cipher state memory and cipher processing the received logical data stream using the cipher information of the received logical data stream;

wherein the cipher processing switching occurs in response to the storage device gaining access to a data block on the storage media during a latency period in which the storage device cannot read the logical data streams from or write the logical data streams to the storage media.

2. The method of claim 1, including switching back to cipher processing the previous logical data stream by interrupting cipher processing the received logical data stream, storing the cipher information of the received logical data stream in the cipher state memory, retrieving the cipher information of the previous logical data stream from the cipher state memory, and resuming cipher processing the previous logical data stream using the cipher information of the previous logical data stream.

3. The method of claim 1, wherein the cipher processing switching occurs at a data block boundary on the storage media for the previous logical data stream in response to the storage device gaining access to a data block on the storage media for the received logical data stream during a latency period in which the storage device cannot read the logical data streams from or write the logical data streams to the storage media.

4. The method of claim 1, wherein the storage device is a disk drive and the storage media is a disk.

5. The method of claim 1, including cipher processing only one logical data stream at a time.

6. In a data processing system including a storage device having a cipher engine, a cipher state memory and a storage media, a method for ciphering data, comprising:

receiving a physical data stream that includes multiple logical data streams;

maintaining cipher information of the logical data streams in the cipher state memory, wherein the cipher information for each logical data stream contains corresponding state information of the cipher engine based on previously cipher processing the logical data stream, thereby enabling resumption of cipher processing the logical data stream; and interleaving cipher processing the logical data streams with the cipher engine using the corresponding cipher information in the cipher state memory, wherein the cipher processing interleaving includes (i) interrupting cipher processing a first logical data stream, (ii) storing the cipher information of the first logical data stream in the cipher state memory, (iii) retrieving the cipher information of a second logical data stream from the cipher state memory, and (iv) cipher processing the second logical data stream using the cipher information of the second logical data stream, wherein the cipher processing interleaving occurs during a latency period in which the storage device cannot read the logical data streams from or write the logical data streams to the storage media.

7. The method of claim 6, wherein the cipher processing interleaving occurs at a data block boundary on the storage media in response to the storage device gaining access to another data block on the storage media.

8. The method of claim 6, wherein the storage device is a disk drive and the storage media is a disk.

9. The method of claim 6, including reading the physical data stream from the storage media.

10. The method of claim 6, including writing the physical data stream to the storage media.

11. The method of claim 6, including loading the physical data stream into a buffer and identifying the logical data streams in the buffer.

12. The method of claim 11, wherein each logical data stream includes multiple data units, each data unit includes identification information identifying the data unit as a part of the corresponding logical data stream, identifying the logical data streams includes reading the data units from the buffer, and the cipher processing interleaving includes determining if the logical data stream of the new data unit is the same as the logical data stream of the last data unit cipher processed, and if not, then the cipher processing interleaving includes (i) storing the cipher information of the last logical data stream in the cipher state memory, (ii) retrieving the cipher information of the new logical data stream from the cipher state memory, and (iii) cipher processing the new logical data stream using the cipher information of the new logical data stream.

13. The method of claim 6, wherein the cipher processing interleaving includes multitasking cipher processing portions of each logical data stream with portions of other logical data streams.

14. The method of claim 13, wherein the multitasking cipher processing includes (i) retrieving the cipher information of a current logical data stream from the cipher state memory and cipher processing the current logical data stream using the cipher information of the current logical data stream, and (ii) upon detecting a cipher processing interleaving event for switching to another logical data stream, storing the cipher information of the current logical data stream in the cipher state memory, retrieving the cipher information of the other logical data stream from the cipher state memory, and cipher processing the other logical data stream using the cipher information of the other logical data stream.

15. The method of claim 6, wherein the physical data stream includes identification information for each logical data stream.

16. The method of claim 6, wherein each logical data stream includes multiple logically sequential data units.

17. The method of claim 16, wherein multiple data units of at least one logical data stream are interspersed with data units of other logical data streams.

18. An apparatus for cipher processing multiple logical data streams of a physical data stream in a storage device having a storage media, comprising:

a cipher state memory for storing cipher information corresponding to each logical data stream;

a cipher engine for cipher processing each logical data stream using the corresponding cipher information in the cipher state memory, wherein the cipher information for each logical data stream contains corresponding state information of the cipher engine based on previously cipher processing the logical data stream, thereby enabling resumption of cipher processing the logical data stream; and a controller that (i) manages physical data stream transfer into and out of a buffer, (ii) controls cipher information transfer into and out the cipher state memory for each logical data stream, and (iii) controls the cipher engine to interleave cipher processing the logical data streams using the cipher information for each logical data stream, wherein the controller controls the cipher engine to interleave cipher processing the logical data streams by multitasking cipher processing each logical data stream with one or more other logical data streams by (i) retrieving the cipher information of a first logical data stream from the cipher state memory and controlling the cipher engine to cipher process the first logical data stream using the cipher information of the first logical data stream, and (ii) upon detecting a cipher switching event to switch to a second logical data stream, storing the cipher information of the first logical data stream in the cipher state memory, retrieving the cipher information of the second logical data stream from the cipher state memory, and controlling the cipher engine to cipher process the second logical data stream using the cipher information of the second logical data stream, and wherein the controller switches the cipher processing of the first logical data stream to the second logical data stream at a data block boundary on the storage media in response to the apparatus gaining access to another data block on the storage media during a latency period in which the apparatus cannot read the logical data streams from or write the logical data streams to the storage media.

19. The apparatus of claim 18, wherein the controller reads the physical data stream from the storage media into the buffer, and controls the cipher engine to multitask cipher processing the logical data streams in the buffer using the corresponding cipher information in the cipher memory.

20. The apparatus of claim 18, wherein the controller transfers the cipher processed logical data streams to the storage media.

21. The apparatus of claim 18, wherein the controller loads the physical data stream into the buffer and reads the physical data stream in the buffer to identify each logical data stream in the buffer.

22. The apparatus of claim 18, wherein each logical data stream includes multiple data units.

23. The apparatus of claim 22, wherein the controller identifies the logical data stream for each data unit in the physical data stream and controls the cipher engine to switch cipher processing from a first logical data stream to a second data logical stream when a data unit for the second logical data stream is identified in the physical data stream.

24. The apparatus of claim 18, wherein the controller switches the cipher processing of the first logical data stream to the second logical data stream at a data block boundary on the storage media for the first logical data stream in response to the apparatus gaining access to another data block on the storage media for the second logical data stream.

25. In a disk drive that includes a transducer, a disk, a cipher engine, a cipher state memory, a buffer and an interface, wherein the transducer reads from and writes to the disk, a method of processing multiple logical data streams, comprising:

receiving a physical data stream at the interface, wherein the physical data stream includes first and second logical data streams that are interleaved with one another, the first logical data stream includes first data blocks and third data blocks, the second logical data stream includes second data blocks, the first and third data blocks are adjacent to one another in the first logical data stream and are separated from one another by the second data blocks in the physical data stream;

encrypting the first data blocks with the cipher engine, thereby generating first encrypted data blocks;

interrupting encrypting the first logical data stream between the first and second data blocks and transferring a first cipher state from the cipher engine to the cipher state memory in response to a first interrupt, wherein the first cipher state contains corresponding state information of the cipher engine based on encrypting the first logical data stream at the first interrupt, and the first cipher state enables the cipher engine to resume encrypting the first logical data stream at the third data blocks;

encrypting the second data blocks with the cipher engine without using the first cipher state, thereby generating second encrypted data blocks after generating the first encrypted data blocks;

transferring the first cipher state from the cipher state memory to the cipher engine and resuming encrypting the first logical data stream at the third data blocks with the cipher engine using the first cipher state, thereby generating third encrypted data blocks after generating the second encrypted data blocks; and writing the first, second and third encrypted data blocks to the disk;

wherein switching the cipher engine from encrypting the first data blocks to encrypting the second data blocks occurs during and in response to a latency period in which the transducer cannot write user data to the disk due to electromechanical delay in the disk drive.

26. The method of claim 25, wherein the cipher engine encrypts only one logical data stream at a time, and the cipher engine is the only cipher engine in the disk drive.

27. The method of claim 25, wherein the cipher state memory is dedicated to the cipher engine.

28. The method of claim 25, wherein the first cipher state includes a first cipher key for encrypting the first logical data stream.

29. The method of claim 25, wherein the first cipher state includes alignment of the first data blocks to sectors on the disk.

30. The method of claim 25, wherein the first cipher state includes transformation of the first data blocks.

31. The method of claim 30, wherein the transformation includes rotating the first data blocks.

32. The method of claim 30, wherein the transformation includes swapping bit locations of the first data blocks.

33. The method of claim 25, wherein the first and second logical data streams are audio/video content.

34. The method of claim 25, wherein the interface is an ATA interface or a 1394 interface.

35. The method of claim 25, including generating the first interrupt in response to detecting a boundary between the first and second data blocks.

36. The method of claim 25, including generating the first interrupt in response to the locations of the first and second logical data streams in the buffer.

37. The method of claim 25, including generating the first interrupt in the middle of a cipher block that is not aligned with the first and second data blocks.

38. The method of claim 25, wherein the electromechanical delay includes the transducer reading a servo preamble from the disk.

39. The method of claim 25, wherein the electromechanical delay includes moving the transducer during a seek operation.

40. The method of claim 25, wherein the electromechanical delay includes rotating the disk until the transducer accesses a selected sector on the disk.

41. The method of claim 25, including switching the cipher engine from encrypting the first data blocks to encrypting the second data blocks and from encrypting the second data blocks to encrypting the third data blocks during and in response to latency periods in which the transducer cannot write user data to the disk due to electromechanical delay in the disk drive.

42. The method of claim 25, including transferring a second cipher state from the cipher state memory to the cipher engine and resuming encrypting the second logical data stream at the second data blocks with the cipher engine using the second cipher state in response to the first interrupt, wherein the second cipher state contains corresponding state information of the cipher engine based on encrypting the second logical data stream at a previous interrupt, and the second cipher state enables the cipher engine to resume encrypting the second logical data stream at the second data blocks.

43. The method of claim 25, including interrupting encrypting the second logical data stream between the second and third data blocks and transferring a second cipher state from the cipher engine to the cipher state memory in response to a second interrupt, wherein the second cipher state contains corresponding state information of the cipher engine based on encrypting the second logical data stream at the second interrupt, and the second cipher state enables the cipher engine to resume encrypting the second logical data stream after the second data blocks.

44. In a disk drive that includes a transducer, a disk, a cipher engine, a cipher state memory, a buffer and an interface, wherein the transducer reads from and writes to the disk, a method of processing multiple logical data streams, comprising:

reading an encrypted physical data stream from the disk, wherein the encrypted physical data stream includes first and second encrypted logical data streams that are interleaved with one another, the first encrypted logical data stream includes first encrypted data blocks and third encrypted data blocks, the second encrypted logical data stream includes second encrypted data blocks, and the first and third encrypted data blocks are adjacent to one another in the first encrypted logical data stream and are separated from one another by the second encrypted data blocks in the encrypted physical data stream;

decrypting the first encrypted data blocks with the cipher engine, thereby generating first data blocks;

interrupting decrypting the first encrypted logical data stream between the first and second encrypted data blocks and transferring a first cipher state from the cipher engine to the cipher state memory in response to a first interrupt, wherein the first cipher state contains corresponding state information of the cipher engine based on decrypting the first encrypted logical data stream at the first interrupt, and the first cipher state enables the cipher engine to resume decrypting the first encrypted logical data stream at the third encrypted data blocks;

decrypting the second encrypted data blocks with the cipher engine without using the first cipher state, thereby generating second data blocks after generating the first data blocks;

transferring the first cipher state from the cipher state memory to the cipher engine and resuming decrypting the first encrypted logical data stream at the third encrypted data blocks with the cipher engine using the first cipher state, thereby generating third data blocks after generating the second data blocks; and sending a physical data stream to the interface, wherein the physical data stream includes first and second logical data streams decrypted from the first and second encrypted logical data streams, respectively, the first logical data stream includes the first and third data blocks, the second logical data stream includes the second data blocks, and the first and third data blocks are adjacent to one another in the first logical data stream;

switching the cipher engine from decrypting the first encrypted data blocks to decrypting the second encrypted data blocks during and in response to a latency period in which the transducer cannot read user data from the disk due to electromechanical delay in the disk drive.

45. The method of claim 44, wherein the cipher engine decrypts only one encrypted logical data stream at a time, and the cipher engine is the only cipher engine in the disk drive.

46. The method of claim 44, wherein the cipher state memory is dedicated to the cipher engine.

47. The method of claim 44, wherein the first cipher state includes a first cipher key for decrypting the first encrypted logical data stream.

48. The method of claim 44, wherein the first cipher state includes alignment of the first encrypted data blocks to sectors on the disk.

49. The method of claim 44, wherein the first cipher state includes transformation of the first encrypted data blocks.

50. The method of claim 49, wherein the transformation includes rotating the first encrypted data blocks.

51. The method of claim 49, wherein the transformation includes swapping bit locations of the first encrypted data blocks.

52. The method of claim 44, wherein the first and second encrypted logical data streams are audio/video content.

53. The method of claim 44, wherein the interface is an ATA interface or a 1394 interface.

54. The method of claim 44, including generating the first interrupt in response to detecting a boundary between the first and second encrypted data blocks.

55. The method of claim 44, including generating the first interrupt in response to the locations of the first and second encrypted logical data streams in the buffer.

56. The method of claim 44, including generating the first interrupt in the middle of a cipher block that is not aligned with the first and second encrypted data blocks.

57. The method of claim 44, wherein the electromechanical delay includes the transducer reading a servo preamble from the disk.

58. The method of claim 44, wherein the electromechanical delay includes moving the transducer during a seek operation.

59. The method of claim 44, wherein the electromechanical delay includes rotating the disk until the transducer accesses a selected sector on the disk.

60. The method of claim 44, including switching the cipher engine from decrypting the first encrypted data blocks to decrypting the second encrypted data blocks and from decrypting the second encrypted data blocks to decrypting the third encrypted data blocks during and in response to latency periods in which the transducer cannot read user data from the disk due to electromechanical delay in the disk drive.

61. The method of claim 44, including transferring a second cipher state from the cipher state memory to the cipher engine and resuming decrypting the second encrypted logical data stream at the second encrypted data blocks with the cipher engine using the second cipher state in response to the first interrupt, wherein the second cipher state contains corresponding state information of the cipher engine based on decrypting the second encrypted logical data stream at a previous interrupt, and the second cipher state enables the cipher engine to resume decrypting the second encrypted logical data stream at the second encrypted data blocks.

62. The method of claim 44, including interrupting decrypting the second encrypted logical data stream between the second and third encrypted data blocks and transferring a second cipher state from the cipher engine to the cipher state memory in response to a second interrupt, wherein the second cipher state contains corresponding state information of the cipher engine based on decrypting the second encrypted logical data stream at the second interrupt, and the second cipher state enables for the cipher engine to resume decrypting the second encrypted logical data stream after the second encrypted data blocks.

63. In a disk drive that includes a transducer, a disk, a cipher engine, a cipher state memory, a buffer and an interface, wherein the transducer reads from and writes to the disk, a method of processing multiple logical data streams, comprising:

receiving a physical data stream at the interface, wherein the physical data stream includes first and second logical data streams that are interleaved with one another, the first logical data stream includes first data blocks and third data blocks, the second logical data stream includes second data blocks, the first and third data blocks are adjacent to one another in the first logical data stream and are separated from one another by the second data blocks in the physical data stream;

encrypting the first data blocks with the cipher engine, thereby generating first encrypted data blocks;

interrupting encrypting the first logical data stream between the first and second data blocks and transferring a first encryption cipher state from the cipher engine to the cipher state memory in response to a first encryption interrupt, wherein the first encryption cipher state contains corresponding state information of the cipher engine based on encrypting the first logical data stream at the first encryption interrupt, and the first encryption cipher state enables the cipher engine to resume encrypting the first logical data stream at the third data blocks;

encrypting the second data blocks with the cipher engine without using the first encryption cipher state, thereby generating second encrypted data blocks after generating the first encrypted data blocks;

transferring the first encryption cipher state from the cipher state memory to the cipher engine and resuming encrypting the first logical data stream at the third data blocks with the cipher engine using the first encryption cipher state, thereby generating third encrypted data blocks after generating the second encrypted data blocks;

writing the first, second and third encrypted data blocks to the disk; then reading an encrypted physical data stream from the disk, wherein the encrypted physical data stream includes first and second encrypted logical data streams that are interleaved with one another, the first encrypted logical data stream includes the first encrypted data blocks and the third encrypted data blocks, the second encrypted logical data stream includes the second encrypted data blocks, and the first and third encrypted data blocks are adjacent to one another in the first encrypted logical data stream and are separated from one another by the second encrypted data blocks in the encrypted physical data stream;

decrypting the first encrypted data blocks with the cipher engine, thereby generating the first data blocks;

interrupting decrypting the first encrypted logical data stream between the first and second encrypted data blocks and transferring a first decryption cipher state from the cipher engine to the cipher state memory in response to a first decryption interrupt, wherein the first decryption cipher state contains corresponding state information of the cipher engine based on decrypting the first encrypted logical data stream at the first decryption interrupt, and the first decryption cipher state enables the cipher engine to resume decrypting the first encrypted logical data stream at the third encrypted data blocks;

decrypting the second encrypted data blocks with the cipher engine without using the first decryption cipher state, thereby generating the second data blocks after generating the first data blocks;

transferring the first decryption cipher state from the cipher state memory to the cipher engine and resuming decrypting the first encrypted logical data stream at the third encrypted data blocks with the cipher engine using the first decryption cipher state, thereby generating the third data blocks after generating the second data blocks;

sending another physical data stream to the interface, wherein the other physical data stream includes the first and second logical data streams decrypted from the first and second encrypted logical data streams, respectively, the first logical data stream includes the first and third data blocks, the second logical data stream includes the second data blocks, and the first and third data blocks are adjacent to one another in the first logical data stream;

switching the cipher engine from encrypting the first data blocks to encrypting the second data blocks and from encrypting the second data blocks to encrypting the third data blocks during and in response to latency periods in which the transducer cannot write user data to the disk due to electromechanical delay in the disk drive; and switching the cipher engine from decrypting the first encrypted data blocks to decrypting the second encrypted data blocks and from decrypting the second encrypted data blocks to decrypting the third encrypted data blocks during and in response to latency periods in which the transducer cannot read user data from the disk due to electromechanical delay in the disk drive.

64. The method of claim 63, wherein the cipher engine encrypts only one logical data stream at a time, the cipher engine decrypts only one encrypted logical data stream at a time, and the cipher engine is the only cipher engine in the disk drive.

65. The method of claim 63, wherein the first encryption cipher state includes a first cipher key for encrypting the first logical data stream, and the first decryption cipher state includes the first cipher key for decrypting the first encrypted logical data stream.

66. The method of claim 63, including generating the first encryption interrupt in response to detecting a boundary between the first and second data blocks, and generating the first decryption interrupt in response to detecting a boundary between the first and second encrypted data blocks.

67. The method of claim 63, including generating the first encryption interrupt in the middle of a cipher block that is not aligned with the first and second data blocks, and generating the first decryption interrupt in the middle of another cipher block that is not aligned with the first and second encrypted data blocks.

68. The method of claim 63, wherein the electromechanical delays include the transducer reading servo preambles from the disk.

69. The method of claim 63, wherein the electromechanical delays include moving the transducer during seek operations and rotating the disk until the transducer accesses selected sectors on the disk.

70. The method of claim 63, including:

transferring a second encryption cipher state from the cipher state memory to the cipher engine and resuming encrypting the second logical data stream at the second data blocks with the cipher engine using the second encryption cipher state in response to the first encryption interrupt, wherein the second encryption cipher state contains corresponding state information of the cipher engine based on encrypting the second logical data stream at a previous encryption interrupt, and the second encryption cipher state enables the cipher engine to resume encrypting the second logical data stream at the second data blocks; and transferring a second decryption cipher state from the cipher state memory to the cipher engine and resuming decrypting the second encrypted logical data stream at the second encrypted data blocks with the cipher engine using the second decryption cipher state in response to the first decryption interrupt, wherein the second decryption cipher state contains corresponding state information of the cipher engine based on decrypting the second encrypted logical data stream at a previous decryption interrupt, and the second decryption cipher state enables the cipher engine to resume decrypting the second encrypted logical data stream at the second encrypted data blocks.

71. The method of claim 63, including:

interrupting encrypting the second logical data stream between the second and third data blocks and transferring a second encryption cipher state from the cipher engine to the cipher state memory in response to a second encryption interrupt, wherein the second encryption cipher state contains corresponding state information based on encrypting the second logical data stream at the second encryption interrupt, and the second encryption cipher state enables for the cipher engine to resume encrypting the second logical data stream after the second data blocks; and interrupting decrypting the second encrypted logical data stream between the second and third encrypted data blocks and transferring a second decryption cipher state from the cipher engine to the cipher state memory in response to a second decryption interrupt, wherein the second decryption cipher state contains corresponding state information of the cipher engine based on decrypting the second encrypted logical data stream at the second decryption interrupt, and the second decryption cipher state enables the cipher engine to resume decrypting the second encrypted logical data stream after the second encrypted data blocks.

\* \* \* \* \*